Patented Nov. 15, 1932

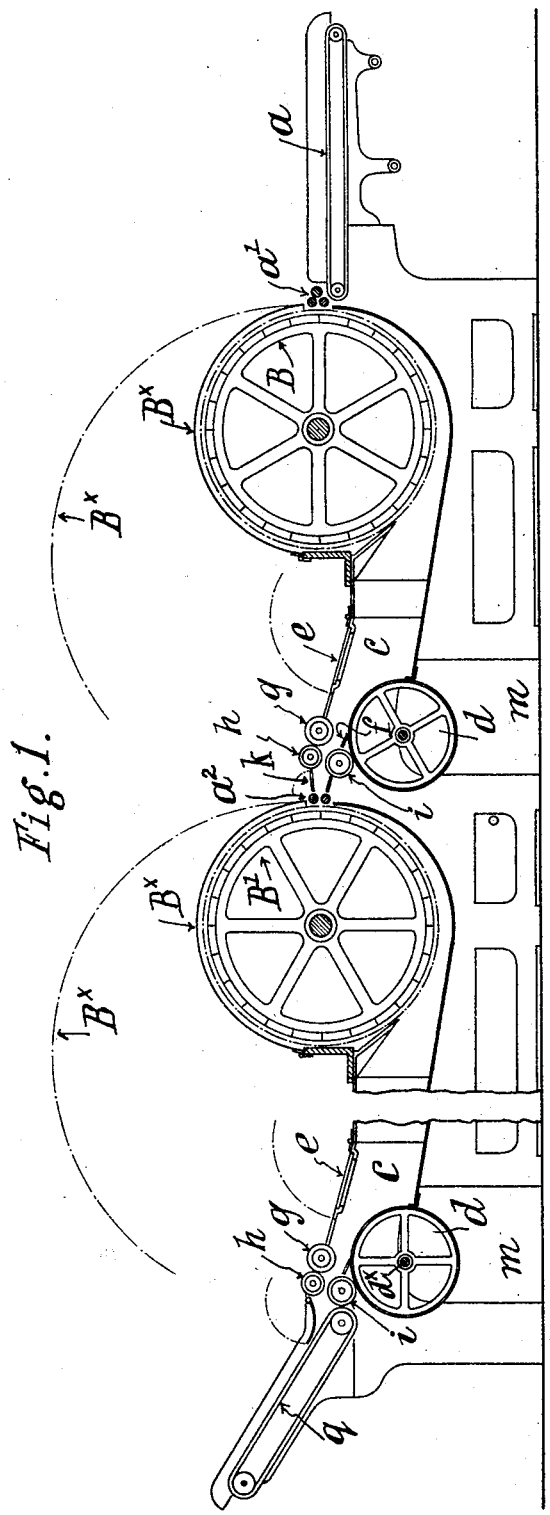

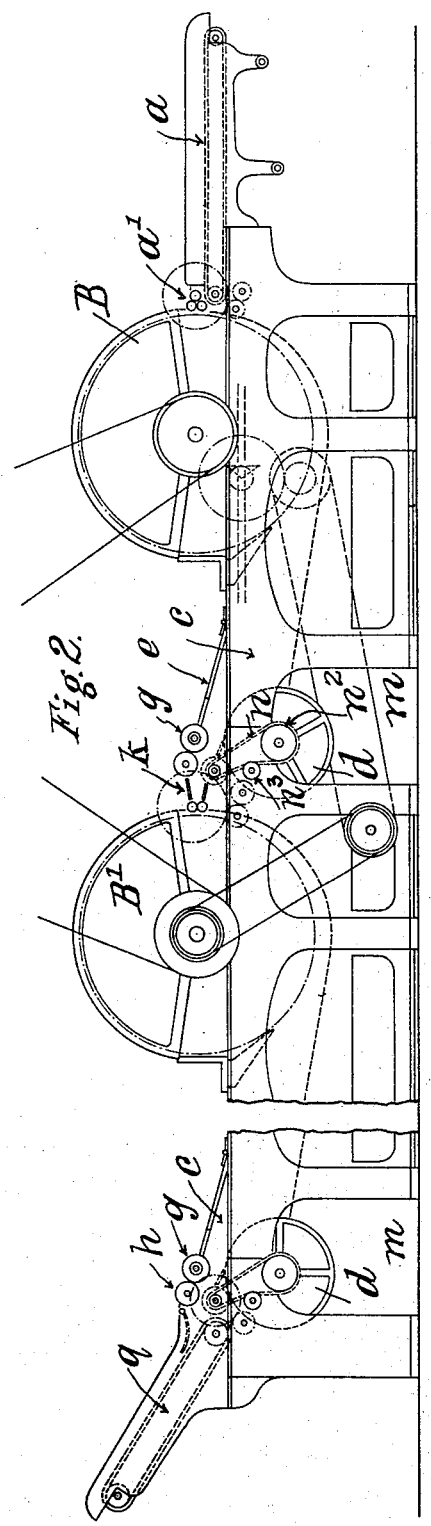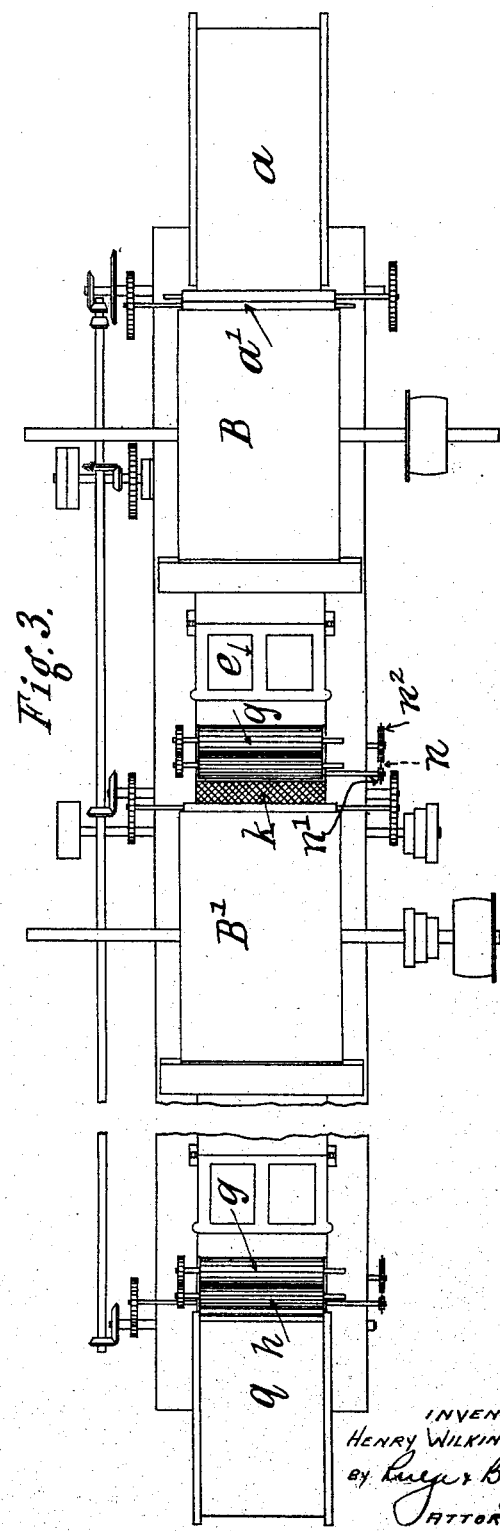

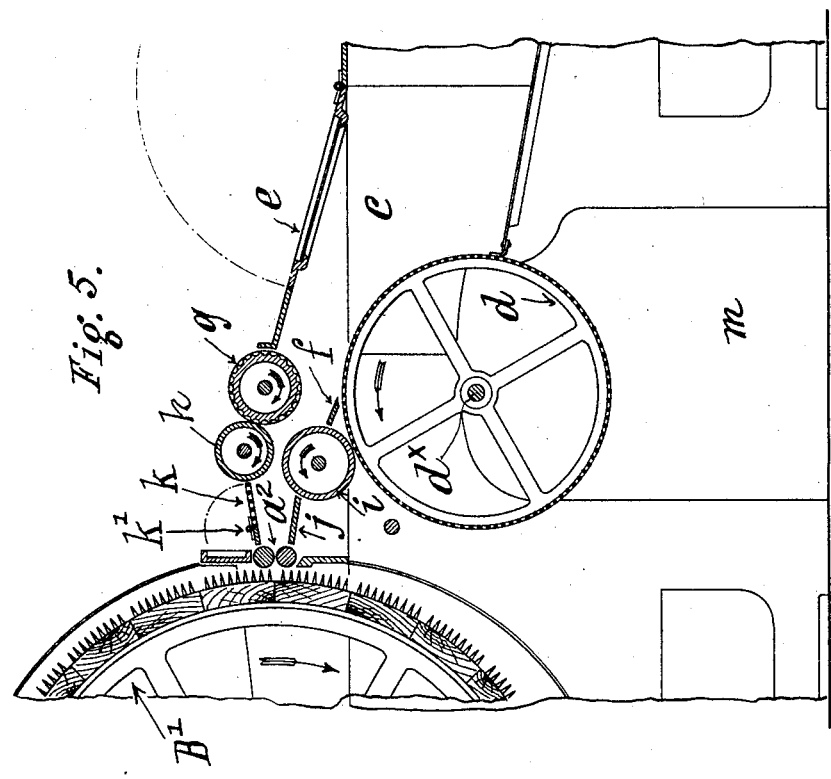
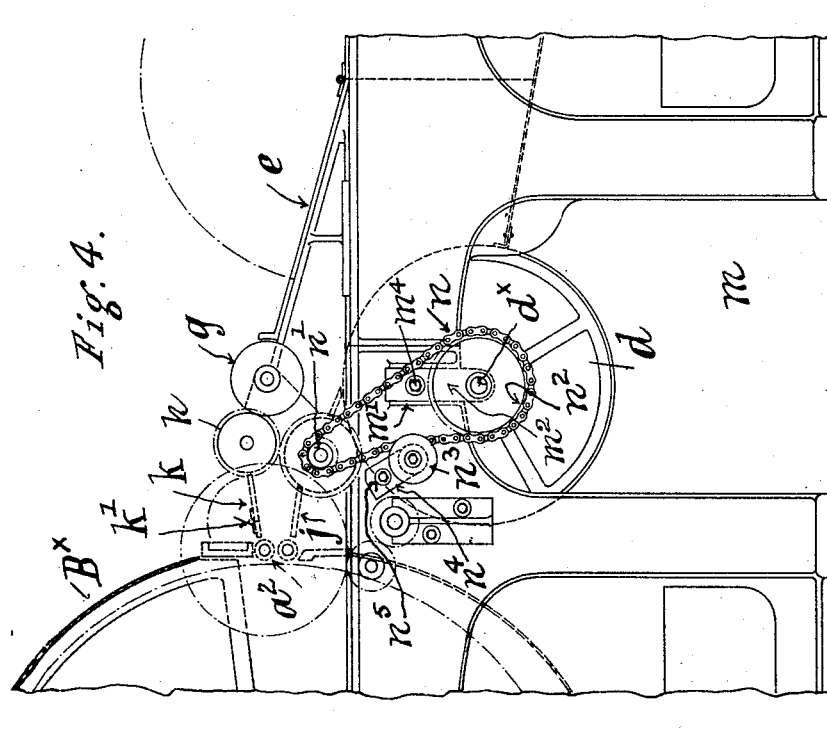

1,887,745

UNITED STATES PATENT OFFICE

HENRY WILKINSON, OF BARROWSHAW, OLDHAM, ENGLAND, ASSIGNOR TO PLATT BROTHERS AND COMPANY LIMITED, OF OLDHAM, ENGLAND

MACHINE FOR OPENING OR BREAKING UP COP-BOTTOMS, COTTON OR OTHER WASTE, OR LIKE FIBROUS MATERIALS

Application filed October 14, 1931, Serial No. 568,766, and in Great Britain January 12, 1931.

This invention relates to improvements in or connected with machines for opening or breaking up cop-bottoms, cotton or other waste, or like fibrous materials, and wherein one or more or a succession of breaking cylinders and cages are used.

The object of my invention is to greatly simplify and improve machines of this class and to provide for easy and quick access to vital sections or parts of such machines and for rapid cage removal in the event of fire.

The above mentioned and other benefits are attained under my invention according to which I get efficient results from use of a single or lower cage instead of two cages (as known) with each succeeding breaking cylinder, further making use of a coarse fluted or equivalent pressure roll in lieu of the normal upper cage, and letting such coarse upper fluted or equivalent pressure roll co-operate with the single cage, and further I make provisions to allow of escape of air forward of each single cage, but in a manner which reduces the risk of undue blowing out of "fly".

The improvements are possible by reason of, and the invention centres around, the use of a single cage per unit of construction, as against two cages (with respect to each breaking cylinder); a pressure roll or rolls taking the place of the normal upper cage. Due to one cage being dispensed with, it is requisite to make provision to quietly get rid of the balance of air and this is arranged for under the invention.

By dispensing with the upper cage, heretofore located as between breaking cylinder casing and breaking cylinder casing, a level or sloping intervening top at a convenient height from the floor can be fashioned and provided with glass covered door of ample dimensions forming the roof of the channel leading to the recited single cage, pressure roll, and feed rollers, etc., and in effect furnishing a four walled conduit with liftable door affording instant access. There being nothing in the way in the form of an overhead cage as heretofore, the lower cage and its driving gear can be instantly got at, and this proposed single cage is driven by quickly disengageable gear and is carried in easily released bearings or supports in slotted or prepared ways in the framing. Thus, my single cage can be quickly released. This is a very important item in practice, and the accessibility for getting at the single cage follows the dispensing with the normal upper cage. As the air currents created require to be got rid of, and one cage being dispensed with, I require to make provision for this and the simplest way is to fit a pivoted perforated grid intermediate of the fine fluted rollers (which receive the fibre from the single cage and the coarse fluted pressure roll) and the feed rollers to the second or succeeding breaking cylinder.

The foregoing is a brief description setting forth the nature of the invention, and the arrangements for practically carrying the invention into effect may be somewhat varied. I shall now describe one suitable construction of machine which embodies the already mentioned features, and in the following description, the accompanying three sheets of drawings will be referred to by me.

I have only shown in the principal figures of the drawings two breaking cylinders in the combination as when additional cylinders are used the parts will simply repeat themselves, additional cylinders, etc., being added on connectable or interchangeable framings as required.

In the accompanying drawings:—

Fig. 1 is a broken longitudinal section of a breaking machine construction according to my invention.

Fig. 2 shows a broken side elevation, whilst

Fig. 3 is a plan view of Fig. 2.

Fig. 4 is an enlarged detail view showing more clearly the important features of the invention.

Fig. 5 is a further enlarged detail view.

I make use of a feed arrangement as is usual, such for example as a lattice $a$. This feeds or passes the cop bottoms or waste between the feed rollers $a'$ to the first breaking cylinder B. Succeeding the breaking cylinder B is a four-walled conduit or trunk marked $c$, which leads onwards (see particularly Fig. 5). This conduit or trunk $c$ sufficiently encloses or envelops a segment or section of the proposed single cage $d$, but not in manner to interfere with the ready lowering of this single cage $d$ when such rapid lowering is necessary. The four-walled conduit or trunk $c$ provides a sloping casing entirely free from over-head obstruction, as no over-head cage is used by me. In the upper wall or roof of such four-walled conduit or trunk $c$, a large inspection door $e$ is provided. The opened yarn or waste, after being acted upon by the breaking cylinder B, reaches the cage $d$, and thereafter passes over a bar or plate $f$, and under a coarse fluted or other equivalent pressure roll $g$, which I provide. This coarse fluted or other pressure roll $g$ is mounted in bearings and is gear driven (see Figs. 3 and 4). Forward of the coarse fluted or other equivalent pressure roll $g$ are two fine fluted pressure rollers $h\ i$ driven by gear or otherwise, and between such two fine fluted pressure rollers $h\ i$ the material passes forward to the feed rollers $a^2$ for the succeeding breaking cylinder $B^1$.

In so doing, the material passes over a plate $j$ about the width of the operative part of the apparatus, which with a hinged perforated plate $k$ located above and properly spaced (and also about the width of the apparatus) provides a channel or passage way. This perforated plate $k$ allows ready escape of excess of air, whilst the hinge provision at $k^1$ permits the turning up of $k$ (as indicated in dotted lines) and so of ready access to the lateral compartment, the upper and lower walls of which are the element $j\ k$.

The framing of the complete apparatus, where the single cage $d$ is located, is suitably fashioned or cut away on either side at $m$, and is also so slotted or fashioned at $m^1$, as that, on detachment of the brackets $m^2$ which support the bearings for the shaft $d^x$ of the cage $d$, the said cage $d$ can be lowered or dropped down into the lateral gap at $m$.

Means are provided to allow quick disconnection of the driving means for the single cage $d$, and a very simple arrangement is shown consisting of an endless chain $n$ passing around a driving chain wheel $n^1$ and a chain wheel $n^2$ on the shaft $d^x$ of the cage $d$, the chain $n$ being deflected by a movable guide wheel $n^3$ during such time as driving of the cage requires to take place. The movable guide wheel $n^3$ is carried on a swing bracket $n^4$ secured by a readily disengageable bolt $n^5$. When the drive is to be disconnected, the guide wheel $n^3$ is moved back, thus instantly slackening the chain $n$ and permitting its removal and the lowering or dropping of the single cage immediately the bolts or the like $m^4$ are undone. It is clear, the manner of driving the single cage $d$ by quickly disconnected gear is susceptible of variation.

A further and valuable advantage which results from my invention is, there being no upper cage as between breaker cylinder casing and breaker cylinder casing, said casing (which I have marked $B^x$) being hinged, can be turned back on the hinges and thrown clear to occupy the intervening space between breaking cylinder and breaking cylinder, as is clear by the broken line indications at Fig. 1.

Also it will be clear the hinged perforated plate $k$ can be readily got at and turned up when required.

Cop bottoms being usually clean, fans may not be necessary, but, if dirty material is to be acted on, fan provision may be appropriate, and any requisite modifications would be made in the construction herein described.

The apparatus may comprise any suitable number of breaking cylinders in the complete combination and the broken fibre may leave the last pair of finely fluted rollers $h\ i$ and be conducted out of the apparatus by a lattice such as that marked $q$.

I claim:

1. Apparatus for opening or breaking-up cop bottoms or other waste, comprising a plurality of breaking cylinders, and a single cage structure preceding a breaking cylinder, a feed trunk, a pressure roll, feed rollers, and a movable perforated grid, a frame-work structure permitting ready mounting of said single cage structure, detachable supports carried by said frame-work, driving mechanism for rotating said single cage structure, and operable means co-operating with and permitting rapid disconnection of said driving mechanism all whereby the single cage structure can be quickly released, lowered and withdrawn, and re-introduced to function with the devices described.

2. Apparatus for opening and breaking-up cop bottoms or other waste, comprising a plurality of breaking cylinders, single cage structure preceding a breaking cylinder, a fibre feed trunk, a single pressure roll, feed rollers, a compartment forward of the feed rollers and a movable perforated grid therefor, a frame-work structure permitting ready mounting of said single cage structure, detachable brackets carried by the frame-work to support said single cage structure, driving mechanism for the latter, and operable means co-operating with and permitting rapid disconnection of said driving mechanism to permit of the single cage structure to be quickly released lowered and withdrawn, and re-introduced all as described herein.

3. Apparatus for opening or breaking-up cop bottoms or other waste, comprising a plurality of breaking cylinders, and with a single cage structure preceding a breaking cylinder, a pressure roller mounted above and cooperating with said single cage structure, a trunk adjacent the single cage structure and pressure roller, a fashioned framework permitting ready mounting and removal of said single cage structure, detachable supports for the axle of the latter, disengageable driving mechanism for rotating said single cage structure to permit of its lowering, and movable operable means permitting rapid disconnection of said disengageable driving mechanism, all whereby the single cage structure can be quickly released, lowered and withdrawn through the fashioned frame-work, and afterwards reintroduced and the driving connections reestablished, all for the purposes related.

4. Apparatus for opening or breaking-up cop bottoms or other waste, comprising a plurality of breaking cylinders, and a single cage structure preceding a breaking cylinder, a pressure roller mounted above and cooperating with said single cage structure, a frame-work with open provision for ready removal or introduction of said single cage structure, detachable support bracket carried from the said frame-work and adapted to receive the axle ends of said single cage structure, a chain wheel on the latter, a removable chain adapted to be driven, and movable means adapted to slacken or render said chain taut, whereby the single cage structure can have its driving gear disconnected, be detached and withdrawn, and reintroduced, mounted and driving connection reestablished, for the purposes described.

In testimony whereof I have signed my name to this specification.

HENRY WILKINSON.